(12) United States Patent
Huang et al.

(10) Patent No.: US 12,323,092 B2
(45) Date of Patent: Jun. 3, 2025

(54) TRACKING TYPE FLEXIBLE PHOTOVOLTAIC BRACKET

(71) Applicant: Xi'an University of Architecture and Technology, Shaanxi Province (CN)

(72) Inventors: Ying Huang, Shaanxi Province (CN); Yanfei Zhu, Shaanxi Province (CN); Yanan Guo, Shaanxi Province (CN)

(73) Assignee: XI'AN UNIVERSITY OF ARCHITECTURE AND TECHNOLOGY, Shaanxi Province (CN)

( * ) Notice: Subject to any disclaimer, the term of this patent is extended or adjusted under 35 U.S.C. 154(b) by 62 days.

(21) Appl. No.: 18/140,077

(22) Filed: Apr. 27, 2023

(65) Prior Publication Data
US 2024/0333204 A1    Oct. 3, 2024

(30) Foreign Application Priority Data
Mar. 27, 2023  (CN) ......................... 202310304687.7

(51) Int. Cl.
*H02S 20/32*    (2014.01)

(52) U.S. Cl.
CPC ................................... *H02S 20/32* (2014.12)

(58) Field of Classification Search
None
See application file for complete search history.

(56) References Cited

U.S. PATENT DOCUMENTS

| 2008/0308091 | A1* | 12/2008 | Corio | F24S 30/425 |
| | | | | 126/606 |
| 2014/0261637 | A1* | 9/2014 | Okandan | H02S 20/10 |
| | | | | 136/251 |
| 2022/0140774 | A1* | 5/2022 | Dally | F16H 19/08 |
| | | | | 136/246 |

FOREIGN PATENT DOCUMENTS

| CN | 115473482 A | * | 12/2022 |
| CN | 115480593 A | * | 12/2022 |

OTHER PUBLICATIONS

Machine translation of CN115473482 (Year: 2022).*
Machine translation of CN115480593A (Year: 2022).*

* cited by examiner

*Primary Examiner* — Tamir Ayad
(74) *Attorney, Agent, or Firm* — WPAT, PC

(57) ABSTRACT

A tracking type flexible photovoltaic bracket is provided, including photovoltaic assemblies, pillars, a driving member, direction-changing mechanisms, and two pulling ropes. Each of the pillars is disposed with a double-rope grooved wheel. The driving member is configured to drive the double-rope grooved wheel arranged on an end of the driving member to rotate. The direction-changing mechanisms are arranged corresponding ones of the pillars in one-to-one manner. Each of the direction-changing mechanisms includes a worm gear assembly and a curved plate assembly. Each of the corresponding ones of the pillars is rotatably connected with the worm gear assembly and the curved plate assembly, and a bottom of the curved plate assembly is disposed with a gear rack. First ends and second ends of the two pulling ropes are wound on the respective double-rope grooved wheels being respectively located on the first ends and the second ends.

7 Claims, 2 Drawing Sheets

TRACKING TYPE FLEXIBLE PHOTOVOLTAIC BRACKET

TECHNICAL FIELD

The disclosure relates to the field of photovoltaic (PV) brackets, and particularly to a tracking type flexible photovoltaic bracket.

BACKGROUND

In recent years, solar photovoltaic power generation has developed rapidly due to strong support from national and local governments. As a supporting structure of an entire photovoltaic power generation system, a photovoltaic support bracket plays an important role in determining the stability, durability, and power generation efficiency of the entire photovoltaic power generation system.

Among existing technologies, flexible photovoltaic support brackets have many advantages such as large span, material saving, and cost reduction, making them be a key research object in the field of photovoltaic technology. However, in complex terrains such as mountains and hills, there are still many problems with existing flexible photovoltaic support brackets, such as high accuracy of construction requirements, difficulty in achieving consistent heights of tops of columns and adapting different slopes, and these problems reduces the power generation efficiency of photovoltaic panels.

In order to solve the above problems, there is a need of providing a tracking type flexible photovoltaic bracket.

SUMMARY

A purpose of the disclosure is to provide a tracking type flexible photovoltaic bracket, aiming to solve or improve at least one of the above problems.

In order to realize the purpose, the disclosure provides following technical solutions. Specifically, a tracking type flexible photovoltaic bracket according to an embodiment of the disclosure includes:
photovoltaic assemblies;
pillars, each of the pillars being disposed with a double-rope grooved wheel;
a driving member, configured to drive the double-rope grooved wheel arranged on an end of the driving member to rotate;
direction-changing mechanisms, arranged corresponding ones of the pillars in one-to-one manner, each of the direction-changing mechanisms including a worm gear assembly and a curved plate assembly, each of the corresponding ones of the pillars being rotatably connected with the worm gear assembly and the curved plate assembly, and a bottom of the curved plate assembly being disposed with a gear rack in meshing transmission with the worm gear assembly; and
two pulling ropes, first ends and second ends of the two pulling ropes being wound on the respective double-rope grooved wheels which are respectively located on the first ends and the second ends, winding directions of the two pulling ropes being opposite, and the double-rope grooved wheels located between the first ends and the second ends being in transmission connection with the two pulling ropes through a traction rope assembly; and moreover, adjacent two the curved plate assemblies having load-bearing ropes disposed therebetween, the photovoltaic assemblies being arranged on the load-bearing ropes, and the double-rope grooved wheel being in transmission connection with the worm gear assembly.

In an embodiment, the traction rope assembly includes traction ropes, each of the double-rope grooved wheels located between the first ends and the second ends is wound with two of the traction ropes, winding directions of the two of the traction ropes wound on the same double-rope grooved wheel are opposite, and the two of the traction ropes wound on the same double-rope grooved wheel are fixedly secured onto the two pulling ropes through fasteners, respectively.

In an embodiment, the curved plate assembly includes:
two connecting plates, fixedly connected to two sides of a top portion of the pillar;
a shaft, fixedly secured onto the two connecting plates;
a horizontal beam, rotatably connected to the shaft; and
a curved plate, fixedly secured onto a bottom of the horizontal beam;
and moreover, the horizontal beam and the curved plate being both located between the two connecting plates, a bottom of the curved plate being provided with the gear rack, and adjacent two the horizontal beams having the load-bearing ropes disposed therebetween.

In an embodiment, the worm gear assembly includes:
a worm, rotatably connected to the top portion of the pillar through two supports; and
a worm gear, rotatably connected onto the two connecting plates;
and moreover, the worm gear and the worm being both located between the two connecting plates, the worm and the gear rack being individually meshed with the worm gear, and the worm being axially connected to the double-rope grooved wheel.

In an embodiment, the driving member includes a motor, the motor is disposed on a corresponding one of the pillars which is located on the first ends, and an output shaft of the motor is axially connected to the double-rope grooved wheel disposed on the corresponding one of the pillars.

In an embodiment, the load-bearing ropes disposed between the adjacent two curved plate assemblies are two in number, the two load-bearing ropes are arranged juxtaposedly, and the photovoltaic assemblies are secured on the two load-bearing ropes and located between the two load-bearing ropes.

In an embodiment, two top ends of the curved plate are fixedly connected to two ends of the horizontal beam, respectively; and the shaft is located at a circle center of the curved plate.

Embodiments of the disclosure may achieve technical effects as follows.

Embodiments of the disclosure drive a double-rope grooved wheel to rotate through a driving member, then other double-rope grooved wheels are driven to rotate synchronously through the two pulling ropes and the traction rope assembly. The double-rope grooved wheels drive the respective curved plate assemblies to rotate through the respective worm gear assemblies, so as to drive the photovoltaic assemblies to rotate synchronously, which is convenient for matching the solar elevation angle and adjusting the photovoltaic assemblies, thus improving the efficiency of photovoltaic power generation.

Embodiments of the disclosure realize flexible transmission through the two pulling ropes and the traction rope assembly, making synchronous rotations of the double-rope grooved wheels be realized even if the tops of pillars are not at the same horizontal height. Photovoltaic assemblies are installed through load-bearing ropes to meet the requirements of large-span construction and can adapt different slopes, which is suitable for construction in complex terrains such as mountainous areas.

BRIEF DESCRIPTION OF DRAWINGS

In order to provide a clearer explanation of the embodiments of the disclosure or the technical solutions in the prior art, a brief description will be given to the drawings required in the embodiments. It is apparent that the drawings in the following description are only some embodiments of the disclosure. For those ordinary skilled in the art, other drawings can also be obtained based on these drawings without any creative work.

DESCRIPTION OF REFERENCE NUMERALS

1—motor; 2—photovoltaic assembly; 3—load-bearing rope; 4—traction rope; 5—pulling rope; 6—pillar; 7—curved plate; 8—horizontal beam; 9—connecting plate; 10—worm gear; 11—support; 12—worm; 13—shaft; 14—fastener; 15—gear rack; 16—double-rope grooved wheel.

DETAILED DESCRIPTION OF EMBODIMENTS

The following will provide a clear and complete description of the technical solution in the embodiments of the disclosure, in combination with the drawings. Apparently, the described embodiments are only a part of the embodiments of the disclosure, not all of them. Based on the embodiments described in the disclosure, all other embodiments obtained by those ordinary skilled in the art without creative work should fall within the scope of protection of the disclosure.

In order to make the above purposes, features, and advantages of the disclosure more apparent and understandable, the following will provide further detailed explanations of the disclosure in combination with the drawings and specific embodiments.

Figure 1:
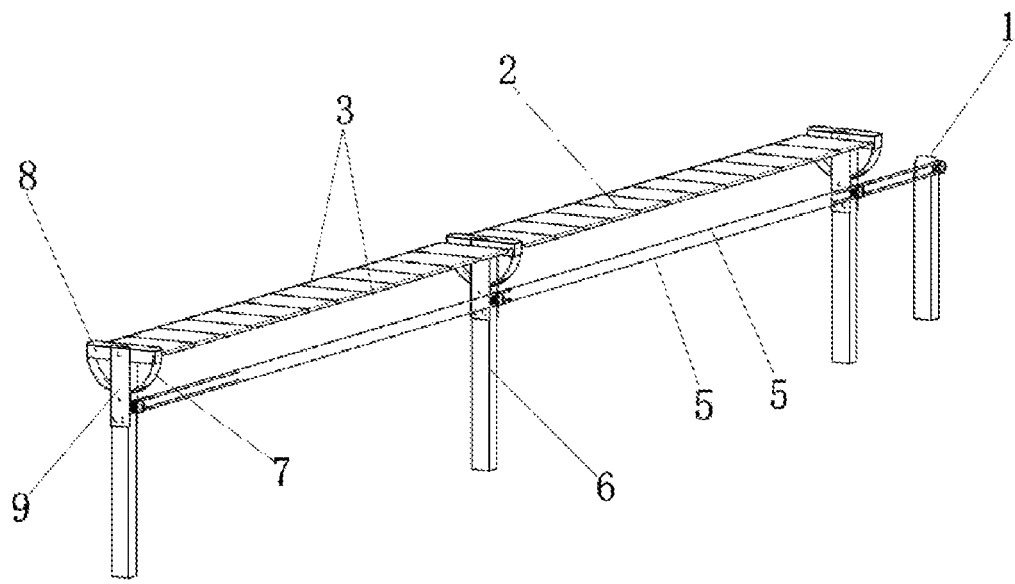
FIG. 1 illustrates a structural schematic diagram of a tracking type flexible photovoltaic bracket according to some embodiments of the disclosure.
Figure 2:
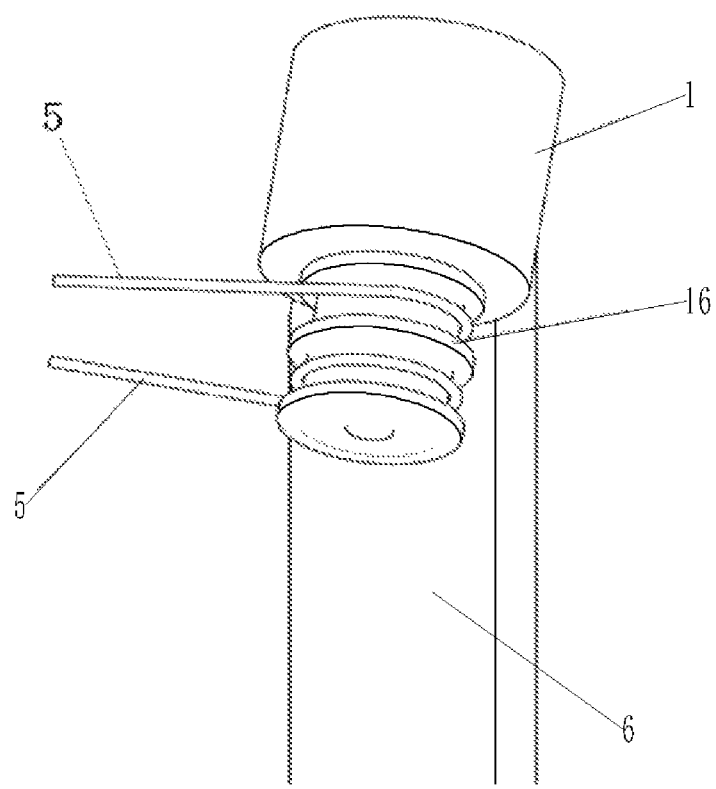
FIG. 2 illustrates a schematic diagram of installation of a driving member according to some embodiments of the disclosure.
Figure 3:
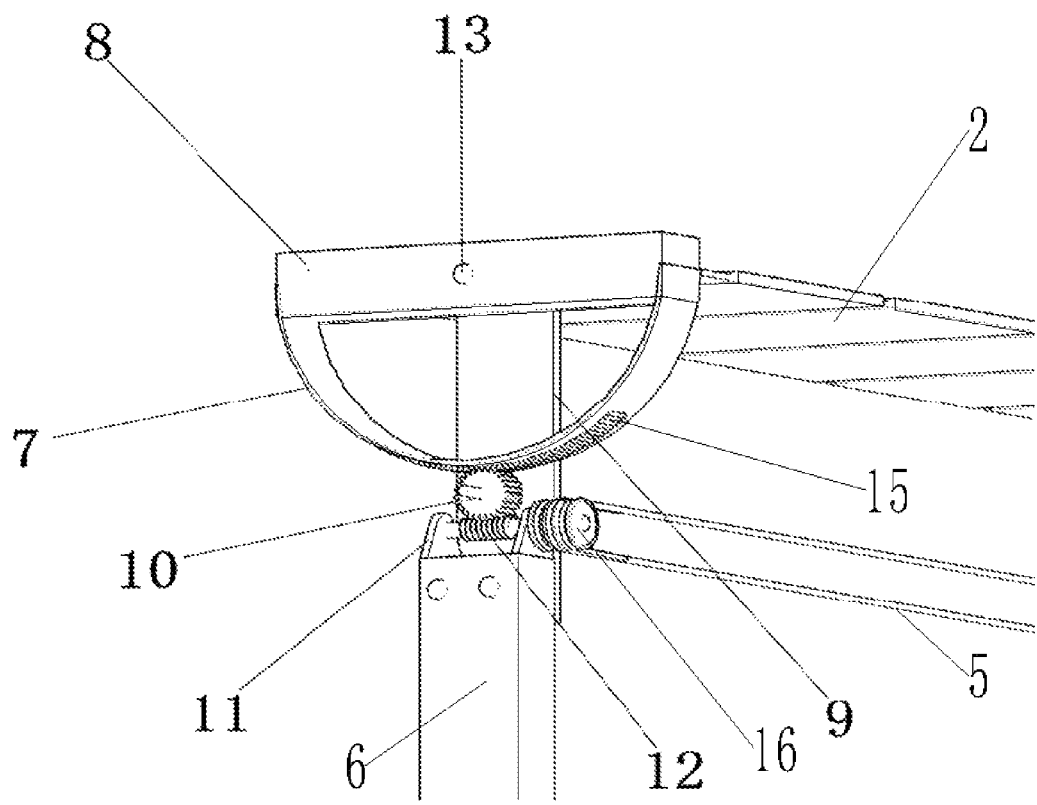
FIG. 3 illustrates a schematic diagram of installation of a direction-changing mechanism according to some embodiments of the disclosure.
Figure 4:
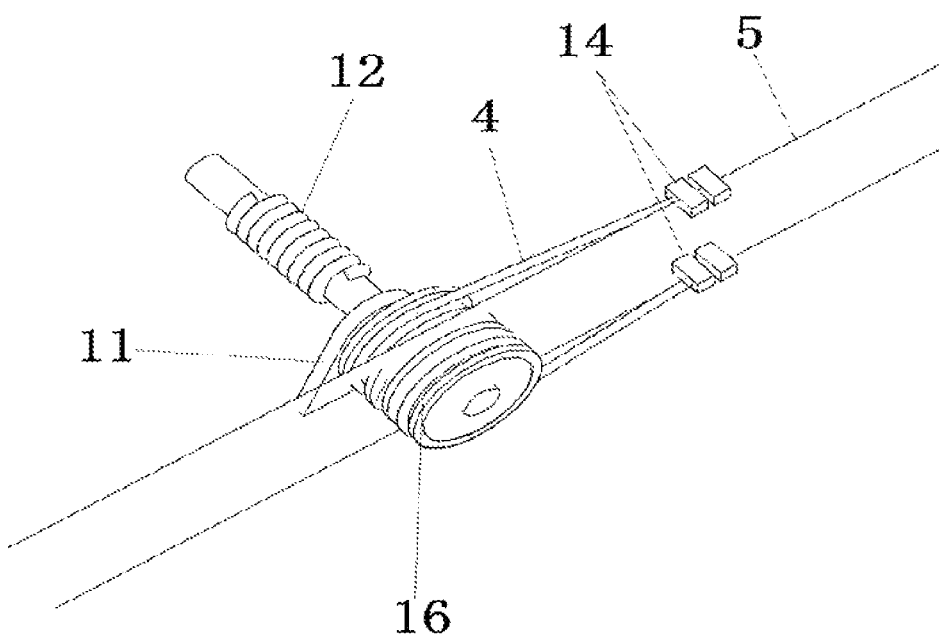
FIG. 4 illustrates a schematic diagram of installation of traction ropes and pulling ropes according to some embodiments of the disclosure.

As shown in FIG. 1 through FIG. 4, a tracking type flexible photovoltaic bracket provide by the disclosure includes:
photovoltaic assemblies 2;
pillars 6, each of the pillars 6 being disposed with a double-rope grooved wheel 16;
a driving member, configured to drive the double-rope grooved wheel 16 arranged on an end of the driving member to rotate;
direction-changing mechanisms, arranged corresponding ones of the pillars 6 in one-to-one manner, each of the direction-changing mechanisms including a worm gear assembly and a curved plate assembly, each of the corresponding ones of the pillars 6 being rotatably connected with the worm gear assembly and the curved plate assembly, and a bottom of the curved plate assembly being disposed with a gear rack 15 in meshing transmission with the worm gear assembly; and
two pulling ropes 5, first ends and second ends of the two pulling ropes 5 being wound on the respective double-rope grooved wheels 16 which are respectively located on the first ends and the second ends, winding directions of the two pulling ropes 5 being opposite, and the double-rope grooved wheels 16 located between the first ends and the second ends being in transmission connection with the two pulling ropes 5 through a traction rope assembly;
and moreover, adjacent two the curved plate assemblies having load-bearing ropes 3 disposed therebetween, the photovoltaic assemblies 2 being arranged on the load-bearing ropes 3, and the double-rope grooved wheel 16 being in transmission connection with the worm gear assembly.

Based on the above setting, the disclosure drives a double-rope grooved wheel 16 to rotate through a driving member, then other double-rope grooved wheels 16 are driven to rotate synchronously through the two pulling ropes 5 and the traction rope assembly. The double-rope grooved wheels 16 drive the curved plate assemblies to rotate through the worm gear assemblies, so as to drive the photovoltaic assemblies 2 to rotate synchronously, which is convenient for matching the solar elevation angle and adjusting the photovoltaic assemblies 2, thus improving the efficiency of photovoltaic power generation. The disclosure only requires one driving member to achieve multi-span synchronous driving and improve work efficiency. In an exemplary embodiment, each of the photovoltaic assemblies 2 is a photovoltaic panel.

The two pulling ropes 5 and the traction rope assembly according to the illustrated embodiment of the disclosure are configured to realize flexible transmission, making synchronous rotations of the double-rope grooved wheels 16 be realized even if the tops of pillars 6 are not at the same horizontal height. Photovoltaic assemblies 2 are installed through load-bearing ropes 3 to meet the requirements of large-span construction and can adapt different slopes, which is suitable for construction in complex terrains such as mountainous areas.

In an embodiment, the traction rope assembly includes traction ropes 4, each of the double-rope grooved wheels 16 located between the first ends and the second ends is wound with two of the traction ropes 4, winding directions of the two of the traction ropes 4 wound on the same double-rope grooved wheel 16 are opposite, and the two of the traction ropes 4 wound on the same double-rope grooved wheel 16 are fixedly secured onto the two pulling ropes 5 through fasteners 14, respectively. In an embodiment, the traction rope 4 is a wire rope.

Under the drive of the driving member, the two pulling ropes 5 move in opposite directions, then the traction ropes 4 moves with the two pulling ropes 5. Two of the traction ropes 4 on the same double-rope grooved wheel 16 are wound in opposite directions, so that the two traction ropes 4 are driven to move in opposite directions under the traction of the two pulling ropes 5, so as to achieve the rotation of the double-rope grooved wheel 16. Through the movement of multiple traction ropes 4, the synchronous rotation of multiple double-rope grooved wheels 16 are driven, thereby achieving the synchronous rotation of the photovoltaic assemblies 2.

In an embodiment, the curved plate assembly includes:

two connecting plates 9, fixedly connected to two sides of a top portion of the pillar 6;

a shaft 13, fixedly secured onto the two connecting plates 9;

a horizontal beam 8, rotatably connected to the shaft 13; and a curved plate 7, fixedly secured onto a bottom of the horizontal beam 8;

and moreover, the horizontal beam 8 and the curved plate 7 being both located between the two connecting plates 9, a bottom of the curved plate 7 being provided with the gear rack 15, and adjacent two the horizontal beams 8 having the load-bearing ropes 3 disposed therebetween.

Based on the above setting, the double-rope grooved wheel 16 rotates to drive the worm gear assembly, and then the gear rack 15 drives the curved plate 7 to rotate along the shaft 13 at a certain angle, thereby achieving the overall rotation of the horizontal beam 8, load-bearing rope 3, and photovoltaic assembly 2. Therefore, the sunlight is always perpendicular to the photovoltaic assembly 2, improving power generation efficiency.

In an embodiment, the worm gear assembly includes:

a worm 12, rotatably connected to the top portion of the pillar 6 through two supports 11; and a worm gear 10, rotatably connected onto the two connecting plates 9;

and moreover, the worm gear 10 and the worm 12 being both located between the two connecting plates 9, the worm 12 and the gear rack 15 being individually meshed with the worm gear 10, and the worm 12 being axially connected to the double-rope grooved wheel 16.

Based on the above setting, the double-rope grooved wheel 16 is driven to rotate under the action of the traction ropes 4 and the pulling ropes 5, thereby driving the worm 12 to rotate. The worm 12 drives the worm gear 10 to rotate, thereby driving the gear rack 15 to rotate, and the gear rack 15 drives the curved plate 7 to rotate to realize the rotation of the photovoltaic assembly 2.

In an embodiment, the motor 1 is disposed on a corresponding one of the pillars 6 which is located on the first ends, and an output shaft of the motor 1 is axially connected to the double-rope grooved wheel 16 disposed on the corresponding one of the pillars 6. The motor 1 is equipped with an electromagnetic holding brake (not shown in the figures). When the motor 1 is powered off, the electromagnetic holding brake also loses power. The electromagnetic holding brake brakes the motor 1 under the action of a spring, so as to realize a locked state.

In an embodiment, the load-bearing ropes 3 disposed between the adjacent two curved plate assemblies are two in number, the two load-bearing ropes 3 are arranged juxtaposedly, and the photovoltaic assemblies 2 are secured on the two load-bearing ropes 3 and located between the two load-bearing ropes 3.

In an embodiment, two ends of the curved plate 7 are fixedly connected to two ends of the horizontal beam 8, respectively, and the shaft 13 is located at a circle center of the curved plate 7.

In an embodiment, each of the pillars 6 is equipped with a photoelectric sensor (not shown in the figures) and a controller (not shown in the figures), both of which are electrically connected to the controller. When the solar height position is different, the received signal is transmitted to the controller through the photoelectric sensor, and the controller drives the motor 1 to rotate, so that the photovoltaic assemblies 2 can be rotated to an appropriate angle, which is convenient for matching the solar elevation angle and adjusting the photovoltaic assemblies 2, thus improving the efficiency of photovoltaic power generation.

In the description of the disclosure, it should be understood that the terms "vertical", "horizontal", "up", "down", "front", "back", "left", "right", "vertical", "horizontal", "top", "bottom", "inside", "outside", and other terms indicating orientation or positional relationships are based on the orientation or positional relationships shown in the drawings, these terms are only for the convenience of describing the disclosure rather than indicating or implying that the device or components of the disclosure must have a specific orientation, be constructed and operated in a specific orientation, and thus these terms cannot be understood as a limitation to the disclosure.

The above described embodiments are only a part of embodiments of the disclosure and do not limit the scope of the disclosure. Without departing from the design principle of the disclosure, various changes and improvements made by those ordinary skilled in the art to the technical solutions of the disclosure should fall within the scope of protection of the claims of the disclosure.

What is claimed is:

1. A tracking type flexible photovoltaic bracket, comprising:

photovoltaic assemblies (2);

pillars (6), wherein the pillars (6) are respectively disposed with double-rope grooved wheels (16);

a driving member, configured to drive one of the double-rope grooved wheels (16) arranged on an end of the driving member to rotate;

direction-changing mechanisms, wherein each direction-changing mechanism is arranged to correspond to a corresponding one pillar of the pillars (6), each of the direction-changing mechanisms comprises a worm gear assembly and a curved plate assembly, the corresponding one pillar of the pillars (6) is rotatably connected with the worm gear assembly and the curved plate assembly, and a bottom of the curved plate assembly is disposed with a gear rack (15) in meshing transmission with the worm gear assembly; and two pulling ropes (5), wherein the two pulling ropes (5) are wound on the double-rope grooved wheels (16), winding directions of the two pulling ropes (5) are opposite, and the double-rope grooved wheels (16) are in transmission connection with the two pulling ropes (5) through a traction rope assembly;

wherein two of the curved plate assemblies are adjacent and have load-bearing ropes (3) disposed therebetween, the photovoltaic assemblies (2) are arranged on the load-bearing ropes (3), and the double-rope grooved wheel (16) disposed on the corresponding one pillar of the pillars (6) is in transmission connection with the worm gear assembly.

2. The tracking type flexible photovoltaic bracket according to claim 1, wherein the traction rope assembly comprises traction ropes (4), each of the double-rope grooved wheels (16) wound by the two pulling ropes (5) is wound with two of the traction ropes (4), winding directions of the two of the traction ropes (4) wound on the same double-rope grooved wheel (16) are opposite, and the two of the traction ropes (4) wound on the same double-rope grooved wheel (16) are fixedly secured onto the two pulling ropes (5) through fasteners (14), respectively.

3. The tracking type flexible photovoltaic bracket according to claim 1, wherein the curved plate assembly comprises:

two connecting plates (9), fixedly connected to two sides of a top portion of the pillar (6);

a shaft (13), fixedly secured onto the two connecting plates (9);

a horizontal beam (8), rotatably connected to the shaft (13); and a curved plate (7), fixedly secured onto a bottom of the horizontal beam (8);

wherein the horizontal beam (8) and the curved plate (7) are both located between the two connecting plates (9), and a bottom of the curved plate (7) is provided with the gear rack (15).

4. The tracking type flexible photovoltaic bracket according to claim 3, wherein the worm gear assembly comprises:

a worm (12), rotatably connected to the top portion of the pillar (6) through two supports (11); and a worm gear (10), rotatably connected onto the two connecting plates (9);

wherein the worm gear (10) and the worm (12) are both located between the two connecting plates (9), the worm (12) and the gear rack (15) are individually meshed with the worm gear (10), and the worm (12) is axially connected to the double-rope grooved wheel (16) disposed on the corresponding one pillar of the pillars (6).

5. The tracking type flexible photovoltaic bracket according to claim 1, wherein the driving member comprises a motor (1), the motor (1) is disposed on a corresponding one of the pillars (6) which is disposed with the one of the double-rope grooved wheels (16), and an output shaft of the motor (1) is axially connected to the one of the double-rope grooved wheels (16) disposed on the corresponding one of the pillars (6).

6. The tracking type flexible photovoltaic bracket according to claim 1, wherein the load-bearing ropes (3) disposed between the adjacent two curved plate assemblies are two in number, the two load-bearing ropes (3) are arranged juxtaposedly, and the photovoltaic assemblies (2) are secured on the two load-bearing ropes (3) and located between the two load-bearing ropes (3).

7. The tracking type flexible photovoltaic bracket according to claim 3, wherein two top ends of the curved plate (7) are fixedly connected to two ends of the horizontal beam (8), respectively.

\* \* \* \* \*